United States Patent
Goyal et al.

(10) Patent No.: US 7,271,724 B2
(45) Date of Patent: Sep. 18, 2007

(54) INTERFERING SMART SHELF

(75) Inventors: Amit Goyal, Stone Mountain, GA (US);
Ian Rosenblum, Chicago, IL (US);
Raymond M. Boyd, Phoenix, AZ (US);
Jaimin A. Soni, Schaumburg, IL (US);
Ahmed F. Hassan, Chicago, IL (US)

(73) Assignee: Accenture Global Services GmbH (CH)

( * ) Notice: Subject to any disclaimer, the term of this patent is extended or adjusted under 35 U.S.C. 154(b) by 313 days.

(21) Appl. No.: 11/091,696

(22) Filed: Mar. 28, 2005

(65) Prior Publication Data

US 2006/0214792 A1   Sep. 28, 2006

(51) Int. Cl.
*G08B 13/14* (2006.01)

(52) U.S. Cl. .............. 340/572.1; 340/572.4; 340/572.5; 340/568.1; 235/385

(58) Field of Classification Search ............. 340/572.1, 340/572.4, 572.5, 568.1; 235/385
See application file for complete search history.

(56) References Cited

U.S. PATENT DOCUMENTS

| | | | |
|---|---|---|---|
| 6,232,876 B1 | 5/2001 | Maloney | |
| 6,601,764 B1 | 8/2003 | Goodwin | |
| 6,750,769 B1 | 6/2004 | Smith | |
| 6,812,838 B1 | 11/2004 | Maloney | |
| 6,866,195 B2 * | 3/2005 | Knowles et al. | 235/385 |
| 7,081,818 B2 * | 7/2006 | Eckstein et al. | 340/572.1 |
| 2003/0216969 A1 | 11/2003 | Bauer | |
| 2006/0103532 A1 * | 5/2006 | Van Fleet | 340/572.1 |

* cited by examiner

*Primary Examiner*—Jeffery Hofsass
*Assistant Examiner*—Samuel J. Walk
(74) *Attorney, Agent, or Firm*—Banner & Witcoff, Ltd.

(57) ABSTRACT

A smart shelf system is disclosed. Objects are placed on a shelf that includes RFID tags. The objects prevent an RFID reader from reading certain RFID tags. The number of objects placed on the shelf may be determined by determining how many RFID tags are unreadable.

15 Claims, 5 Drawing Sheets

INTERFERING SMART SHELF

BACKGROUND OF THE INVENTION

1. Field of the Invention

The present invention relates generally to inventory monitoring systems and methods. More particularly, the present invention provides systems and methods for identifying stored items with the use of radio frequency identification tags attached to storage shelves.

2. Description of Related Art

Businesses use a variety of systems for tracking inventory. For example, it is common to use bar code scanners to read bar codes attaches to products to identify and count the products. One limitation of such systems is that they require a line of sight between the bar code scanner and the bar code. If the product containing the bar code is not positioned properly with respect to the bar code scanner or an object is placed between the bar code scanner and the bar code, the bar code scanner cannot read the bar code.

The use of radio frequency identification (RFID) tags has increased in part because systems that use RFID tags do not have some of the limitations associated with bar code systems. For example, RFID tag readers generally do not require a line of sight with RFID tags. RFID tags are also capable of storing large amounts of information.

With conventional RFID system configurations RFID tags are attached to products with adhesives. RFID tags have been used infrequently with low priced products. As the price of products decreases, the cost of an RFID tags becomes a larger percentage of the price of the product and the use of RFID tags becomes cost prohibitive. There are also costs associated with applying RFID tags to products and programming RFID tags. Another limitation with conventional RFID system configurations is that it can be difficult for RFID tag readers to read RFID tags attached to objects that contain liquid or metal.

Therefore, there exists a need in the art for inventory tracking systems and methods that take advantage of the capabilities offered by RFID tags while limiting the costs associated with using, applying and programming such tags.

BRIEF SUMMARY OF THE INVENTION

Aspects of the present invention provide systems and methods that can be used to perform inventory monitoring. Among other advantages, the disclosed systems and methods facilitate efficient and continuous inventory tracking. In one embodiment of the invention, a plurality of RFID tags are coupled to a shelf. Objects placed on the shelf prevent an RFID tag reader from reading corresponding RFID tags. The number of objects placed on the shelf may be determined by identifying how may RFID tags are unreadable.

In another embodiment of the invention, computer-executable instructions for performing one or more of the disclosed methods are stored on a computer-readable medium, such as a floppy disk or CD-ROM.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Exemplary Operating Environment

Figure 1:
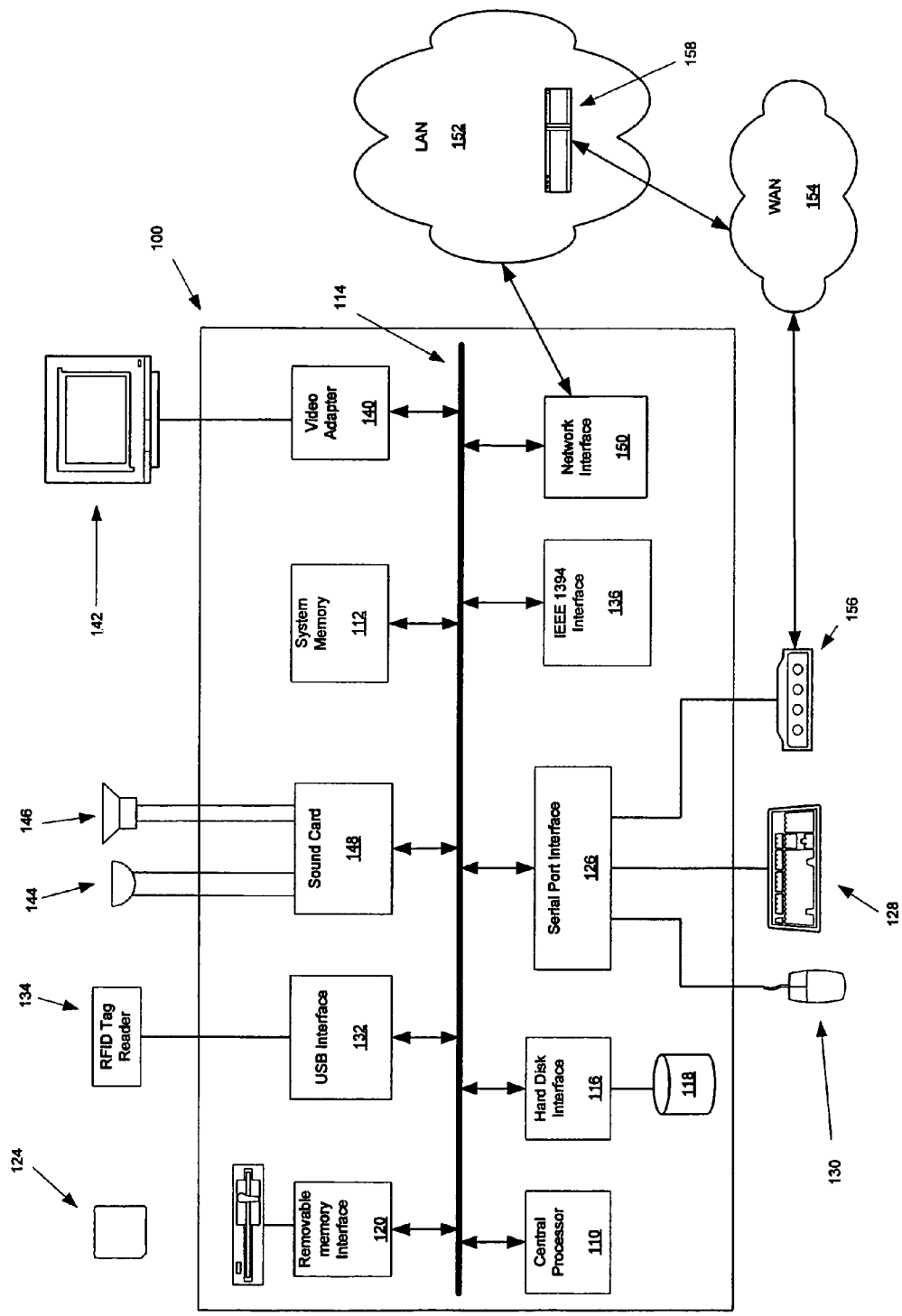
FIG. 1 illustrates an exemplary operating environment for implementing aspects of the invention.

Aspects of the invention may be implemented with conventional networked computer systems that include RFID tag readers, such as the system shown in FIG. 1. A computer device 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer device 100 may also include a variety of interface units and drives for reading and writing data. In particular, computer device 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer device 100. A single hard disk drive 118 and a single removable memory drive 122 are shown for illustration purposes only and with the understanding that computer device 100 may include several of such drives. Furthermore, computer device 100 may include drives for interfacing with other types of computer readable media.

A user can interact with computer device 100 with a variety of input devices. FIG. 1 shows a serial port interface 126 coupling a keyboard 128 and a pointing device 130 to system bus 114. Pointing device 130 may be implemented with a mouse, track ball, pen device, or similar device. Of course one or more other input devices (not shown) such as a joystick, game pad, satellite dish, scanner, touch sensitive screen or the like may be connected to computer device 100.

Computer device 100 may include additional interfaces for connecting devices to system bus 114. FIG. 1 shows a universal serial bus (USB) interface 132 coupling an RFID reader 134 to system bus 114. In some embodiments of the invention RFID reader 134 may be implemented with any conventional RFID reader. In other embodiments of the invention, RFID reader 134 may be implemented with a reader adapted to perform one or more of the methods disclosed herein. An IEEE 1394 interface 136 may be used to couple additional devices to computer device 100. Furthermore, interface 136 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer device 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer device 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer device 100. FIG. 1 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer device 100 can be controlled by a variety of different program modules. Examples of program modules are routines, programs, objects, components, data structures, etc., that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

Figure 2:
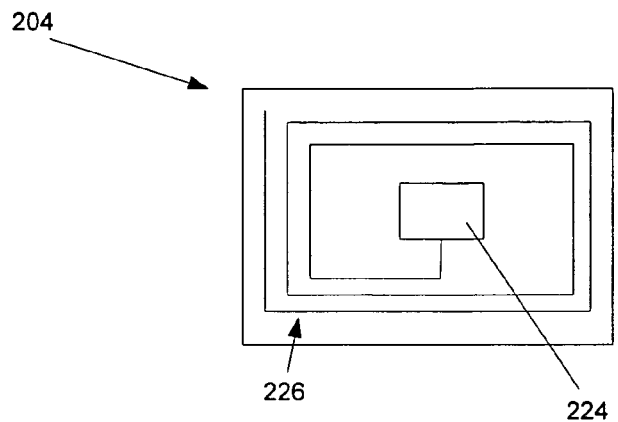
FIG. 2 illustrates a conventional RFID tag.

FIG. 2 illustrates a conventional RFID tag 204. The structure and operation of RFID tags are well-known to those skilled in the art. A semiconductor chip 224 stores information such as the identification of an object, properties of the object or any other information. An antenna 226 may wrap around semiconductor chip 224 and absorb electromagnetic radiation emitted by a source, such as RFID reader 134 (shown in FIG. 1). The received electromagnetic radiation energy may be used to provide power to semiconductor chip 224. In particular, the energy may be used to read information stored in chip 224 and transmit electromagnetic radiation from tag 204 to a reader. Of course, a variety of other tags may be used with the present invention. For example, the present invention may be used with active RFID tags. Active RFID tags contain a power source, such as a battery, that can be used to provide power to chip 224 and antenna 226. One of the advantages of active RFID tags is that they generally have a longer range than passive RFID tags, such as tag 204 shown in FIG. 2.

Exemplary Embodiments

Figure 3:
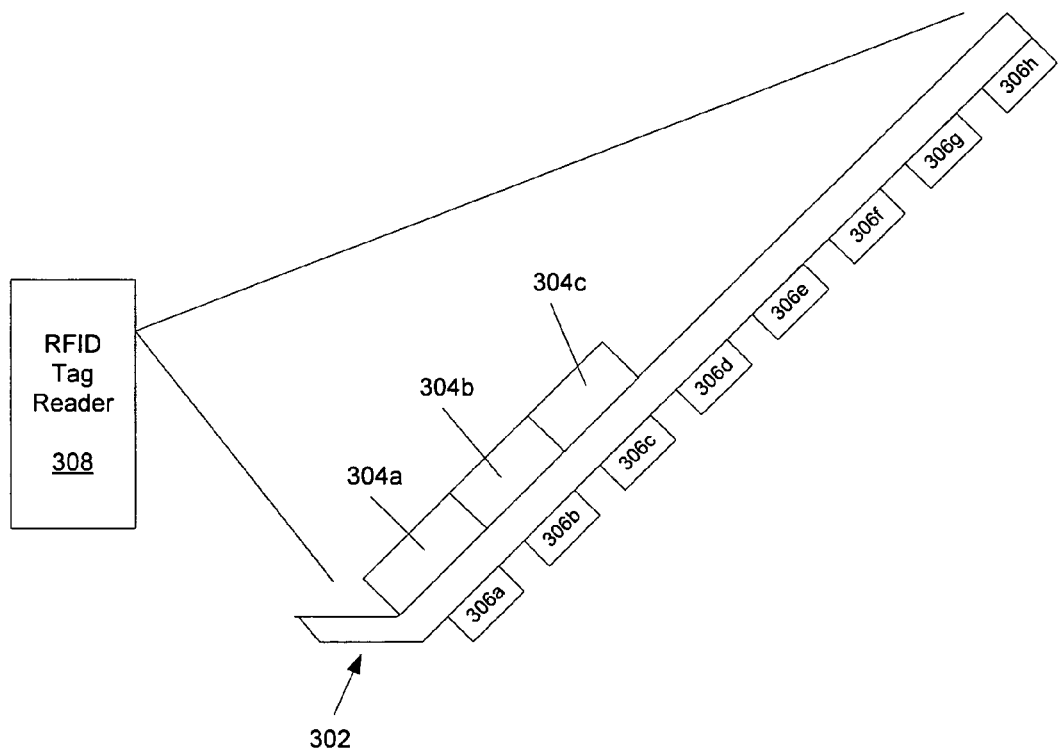
FIG. 3 illustrates a smart shelf system in accordance with an embodiment of the invention.

FIG. 3 illustrates a smart shelf system in accordance with an embodiment of the invention. A shelf 302 supports a group of objects 304a-304c. A plurality of RFID tags 306a-306h are coupled to shelf 302. Objects 304a-304c included material or are contained in packages that contain material that interfere with the operation of RFID tag reader systems. For example objects 304a-304c may contain metal, water or some other material that interferes with the transmission of radio frequency energy.

In the exemplary system shown in FIG. 3, object 304a is placed between RFID tag reader 308 and RFID tag 306a. Object 304a includes or contains a material that prevents RFID tag reader 308 from reading RFID tag 306a. For example, object 304a may be a product placed within a metallic wrapper. With the exemplary system shown in FIG. 3, RFID tag reader 308 may determine a number of objects placed on shelf 302 by determining how many of RFID tags 306a-306h are unreadable.

There is a one-to-one correspondence between RFID tags and objects in the system shown in FIG. 3. In alternative embodiments, there may not be a one-to-one correspondence. For example, at different times a single shelf or other storage apparatus may be used to store objects having different sizes. An RFID tag reader or other device may be programmed to recognize that a single object corresponds to more than one RFID tag. RFID tags may also be arranged in two dimensional arrays and/or placed above or beside corresponding objects.

Figure 4:
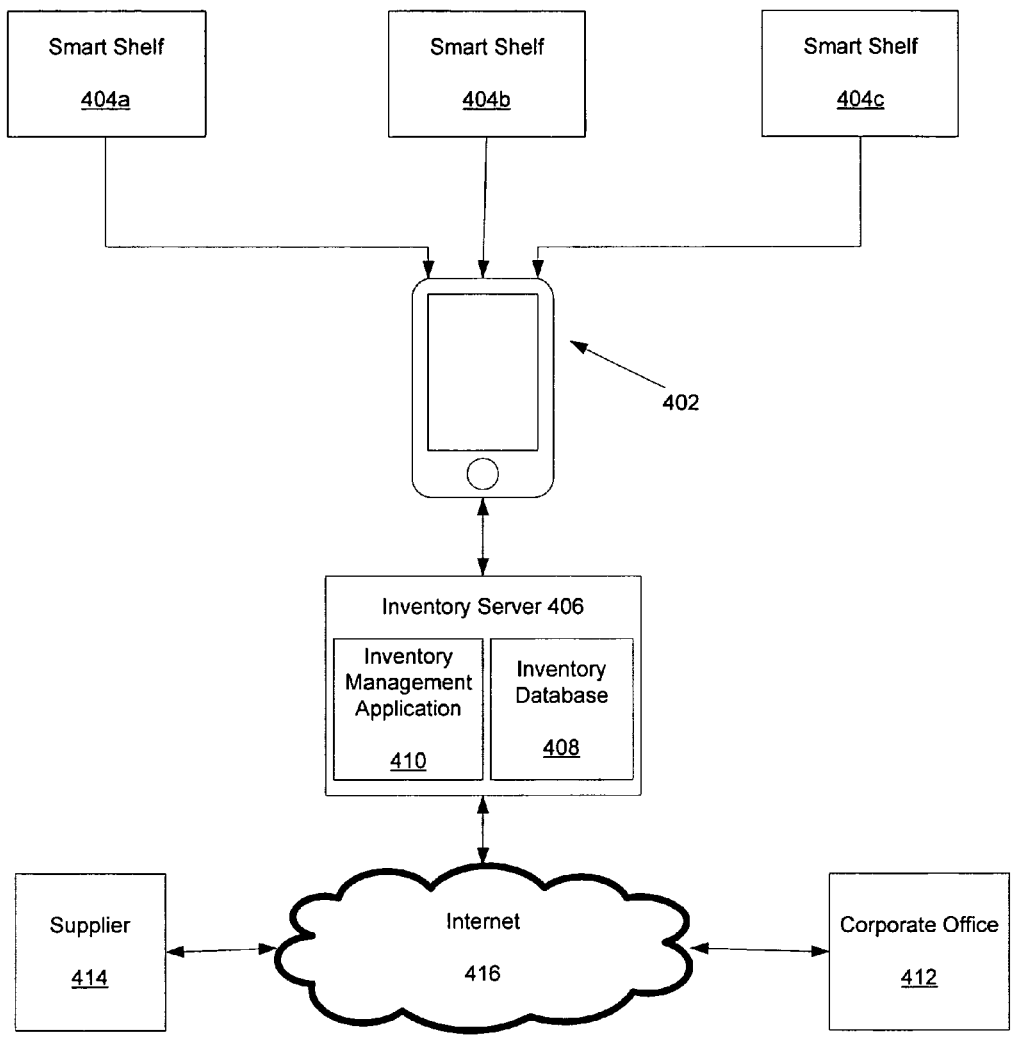
FIG. 4 illustrates a system for managing inventory that includes a plurality of smart shelves, in accordance with an embodiment of the invention.

FIG. 4 illustrates a system for managing inventory that includes a plurality of smart shelves, in accordance with an embodiment of the invention. An RFID tag reader 402 is used to determine inventory placed on smart shelves 401a-404c. RFID tag reader 402 may function in a manner similar to that of RFID tag reader 308 (shown in FIG. 3). RFID tag reader 402 may be implemented with a handheld computer device that includes RFID tag reading functionality or some other device that is capable of reading RFID tags, such as one located in a fixed position. RFID tag reader 402 may also use a plurality of antenna elements. For example, smart shelves 404a-404c may each include an antenna element located in a fixed position and coupled to RFID tag reader 402. After collecting inventory information from smart shelves 404a-404c, RFID tag reader 402 may transmit the inventory information to an inventory server 406.

Inventory server 406 may include an inventory database 408 and an inventory management application 410. Inventory database 408 may store information regarding objects stored on smart shelves 404a-404c. Inventory management application 410 main retrieve information from inventory database 408 and perform such functions as reporting inventory data to a corporate office 412 or ordering new inventory from a supplier, such as supplier 414. Inventory server 406 is shown coupled to corporate office 412 and supplier 414 via the Internet 416. One skill in the art will appreciate that a variety of different communication channels may be used to communicate inventory information. For example, inventory server 406 may be configured to communicate with supplier 414 directly over a telephone line and transmit inventory data to corporate office 412 via a satellite link. One skilled in the art will appreciate that aspects of the invention may be used with a variety of conventional systems that obtain inventory information and then act on the inventory information by generating reports, performing comparisons, ordering inventory, etc.

Figure 5:
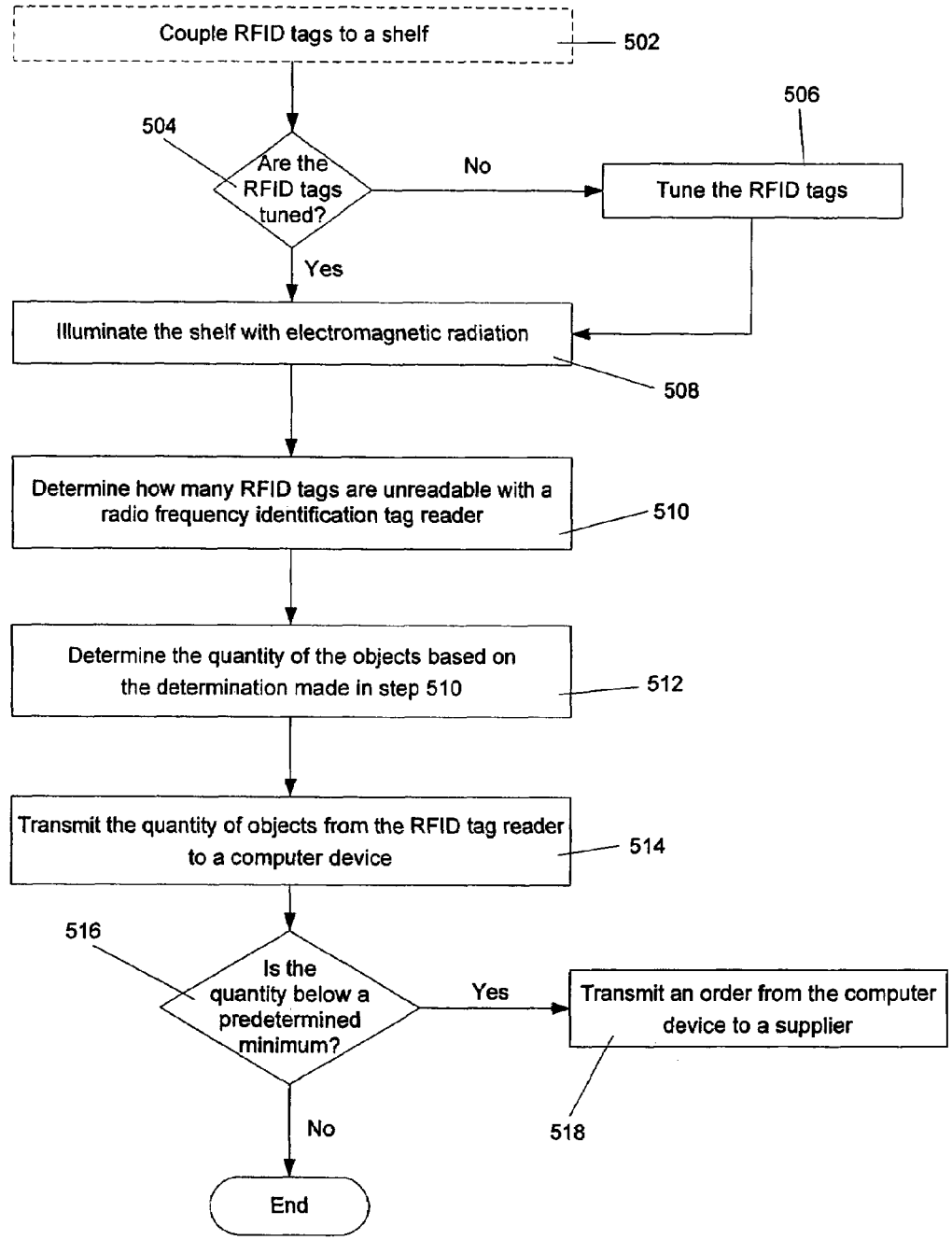
FIG. 5 illustrates a method may be used to monitor the presence of objects, in accordance with an embodiment of the invention.

FIG. 5 illustrates a method may be used to monitor the presence of objects, in accordance with an embodiment of the invention. First, in step 502 RFID tags are coupled to a shelf. Step 502 may be use to retrofit existing shelves and may not be needed with existing smart shelves. As used herein, an RFID tag is coupled to a shelf when the RFID tag is attached to, embedded within or otherwise arranged to maintain a fixed position relative to the shelf. In step 504 it is determined whether or not the RFID tags are tuned. Step 504 may include placing an object between an RFID tag and RFID tag reader and determining whether or not the RFID tag reader can read the RFID tag. When the RFID tags are not tuned, in step 506 the RFID tags are tuned.

It may be necessary to tune RFID tags when, for example, new or different objects are placed on a smart shelf. Each type of object may have different characteristics that impact the reading of RFID tags. For example, a first object may prevent the reading of an RFID tag while a second object have less metal may not prevent the reading of the RFID tag.

Figure 6:
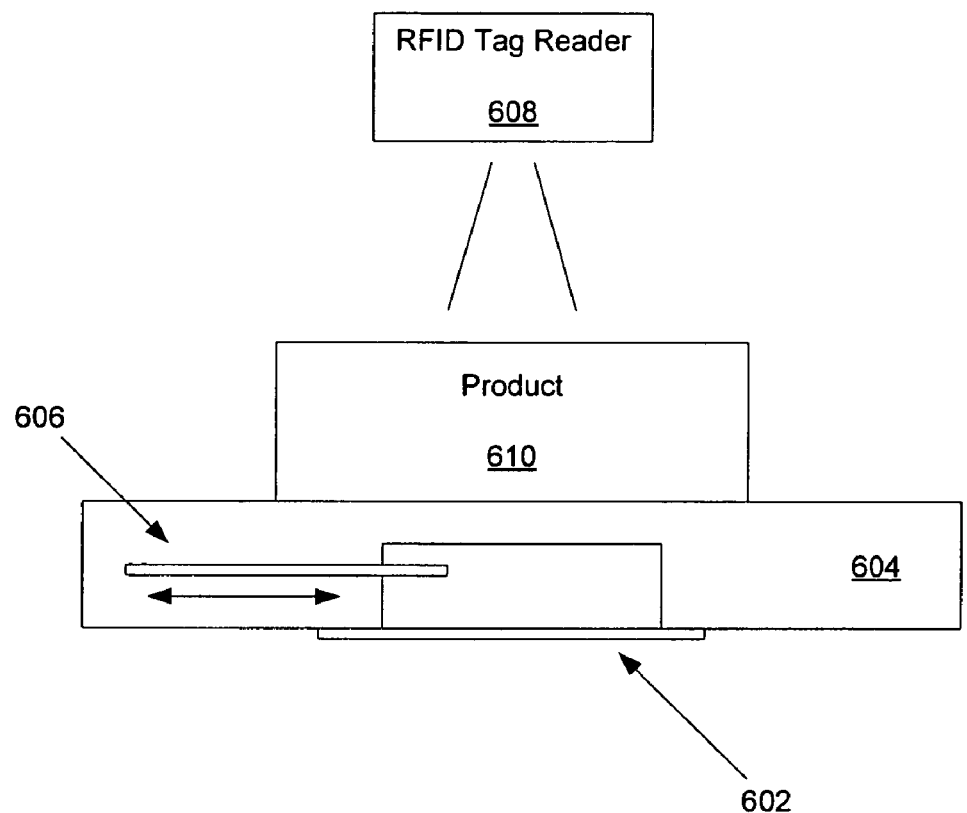
FIG. 6 illustrates an exemplary configuration for tuning RFID tags, in accordance with an embodiment of the invention.

FIG. 6 illustrates an exemplary configuration for tuning RFID tags, in accordance with an embodiment of the invention. An RFID tag 602 is adhered to a shelf 604. The position of an interfering member 606 may be adjusted to control the amount of radio frequency energy transferred between an RFID tag reader 608 and RFID tag 602. For example, interfering member 606 may be formed of a metallic substance that blocks or reduces the transmission radio frequency energy. The readability of RFID tag 602 is a function of the amount that interfering member 606 is placed between RFID tag 602 and RFID tag reader 608. The tuning characteristics may be optimized for a given product 610 to ensure that RFID tag 602 cannot be read by RFID reader 608 when object 610 is placed between RFID tag 602 and RFID tag reader 608. Of course, RFID tags may be tuned by bending their antennas, changing their angles with respect to an RFID reader or with any other conventional tuning methods.

Returning to FIG. 5, in step 508 an RFID tag reader illuminates a shelf with electromagnetic radiation. Step 508 may include the conventional process of an RFID tag reader transmitting radio frequency radiation. Next, in step 510 it is determined how many RFID tags are unreadable with the RFID tag reader. As discussed with reference to FIG. 3, objects may be positioned to prevent RFID tags from being read by an RFID tag reader. In step 512 the quantity of objects is determined based on the determination made in step 510. When there is a one-to-one correspondence between objects and RFID tags, the quantity of objects corresponds to the number of tags that are unreadable. In step 514, the quantity of objects is transmitted from the RFID tag reader to a computer device, such as inventory server 406 (shown in FIG. 4). Next, in step 516 the computer device determines whether the quantity of objects is below a predetermined minimum. When the quantity is below the predetermined minimum, in step 518 the computer device transmits an order to a supplier. For example, a store may desire to maintain a certain quantity of products and a computer device may be programmed to order additional products when the quantity available drops below a predetermined minimum.

One skill in the art will appreciate that aspects of the invention may be used with a variety of conventional systems designed to maintain inventories and process inventory data.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, aspects of the invention may be used with system that operate at frequencies other than radio frequencies.

We claim:

1. A shelf system adapted to monitor the presence of objects, the shelf system comprising:
    a shelf configured to support a plurality of objects;
    a plurality of radio frequency identification tags coupled to the shelf and positioned such that objects placed on the shelf prevent a radio frequency identification tag reader from reading at least some of the radio frequency identification tags; and
    at least one blocking element coupled to the shelf for tuning at least one of the plurality of radio frequency identification tags.

2. The shelf system of claim 1, further including:
    a radio frequency identification tag reader positioned such that objects placed on the shelf are placed between the radio frequency identification tag reader and the plurality of radio frequency identification tags.

3. The shelf system of claim 1, wherein the plurality of radio frequency identification tags are embedded within the shelf.

4. The shelf system of claim 1, further including a plurality of antenna elements coupled to the radio frequency identification tag reader.

5. The shelf system of claim 1, wherein the objects placed on the shelf comprise products located within a package that contains a metallic wrapper.

6. A method of monitoring a quantity of objects located on a shelf having a plurality of radio frequency identification tags, the method comprising:
    (a) illuminating the shelf with electromagnetic radiation;
    (b) determining a quantity of the radio frequency identification tags that are unreadable with a radio frequency identification tag reader because of the presence of the objects;
    (c) determining the quantity of the objects based on the determination made in (b); and
    (d) tuning the radio frequency identification tags so that the objects prevent the reader from reading the radio frequency identification tags when the objects are placed between the reader and the radio frequency identification tags.

7. The method of claim 6, wherein (b) comprises determining a quantity of radio frequency identification tags that are covered by the objects.

8. The method of claim 6, further including:
(e) transmitting the quantity of objects from the reader to a computer device; and
(f) transmitting an order from the computer device to a supplier.

9. The method of claim 6, wherein (d) comprises adjusting an angle of a surface of a radio frequency identification tag relative to the reader.

10. The method of claim 6, wherein (d) comprises deforming at least a portion of an antenna of a radio frequency identification tag.

11. The method of claim 6, wherein the objects comprise products located within a package that contains a metallic wrapper.

12. A method of monitoring inventory, the method comprising;
(a) placing a quantity of objects on a shelf that contains a plurality of radio frequency identification tags;
(b) positioning a radio frequency identification tag reader such that the objects are between the radio frequency identification tag reader and at least some of the radio frequency identification tags;
(c) determining the quantity of the objects by determining a number of radio frequency identification tags that are unreadable with a radio frequency identification tag reader; and
(d) tuning the radio frequency identification tags so that when placed on the shelf, the objects prevent the radio frequency identification tag reader from reading at least one of the radio frequency identification tags.

13. The method of claim 12, wherein (d) comprises:
adjusting an angle of a surface of a radio frequency identification tag relative to the radio frequency identification scanner.

14. The method of claim 12, wherein (d) comprises:
deforming at least a portion of an antenna of a radio frequency identification tag.

15. The method of claim 12, wherein the objects comprise products located within packages that contain metallic wrappers.

* * * * *